United States Patent [19]

Eklof et al.

[11] 3,833,766

[45] Sept. 3, 1974

[54] VOICED CONTROLLED GAIN SWITCHED LOUD-SPEAKING TELEPHONE SYSTEM

[75] Inventors: Anders A. Eklof, Fayetteville; Ronald Binks, Chambersburg, both of Pa.

[73] Assignee: Global Systems Design Corporation, Chambersburg, Pa.

[22] Filed: Oct. 18, 1972

[21] Appl. No.: 298,513

[52] U.S. Cl. ............................ 179/1 HF, 179/1 VC

[51] Int. Cl. ............................ H04m 1/00

[58] Field of Search..... 179/1 VC, 1 H, 1 HF, 81 B, 179/90 B

[56] References Cited

UNITED STATES PATENTS

| | | | |
|---|---|---|---|
| 3,136,864 | 6/1964 | Cleary | 179/1 VC |
| 3,146,313 | 8/1964 | Ulin | 179/81 B |
| 3,168,619 | 2/1965 | Harrison | 179/1 H |
| 3,423,531 | 1/1969 | Doddington | 179/1 VC |
| 3,515,815 | 6/1970 | Baynard | 179/90 B |
| 3,536,838 | 10/1970 | Noonan | 179/1 VC |

*Primary Examiner*—Kathleen H. Claffy
*Assistant Examiner*—Jon Bradford Leaheey
*Attorney, Agent, or Firm*—Michael W. York

[57] ABSTRACT

A loud-speaking telephone system having voice controlled gain switched transmit and receive channel amplifiers, voice controlled gain switched amplifier gain control circuits, a two to four wire hydrid bridge with telephone line loop d.c. current bypass circuit and a telephone line impedance balancing network. The loud-speaking telephone system has provisions for permitting alternative conventional handset usage and it may be integrated with an automatic telephone dialing system.

8 Claims, 6 Drawing Figures

VOICED CONTROLLED GAIN SWITCHED LOUD-SPEAKING TELEPHONE SYSTEM

BACKGROUND OF THE INVENTION

Loud-speaking telephone systems are well known in the art and telephone instruments incorporating a loud-speaking capability conventionally include a microphone and transmit channel amplifier, a receive channel amplifier and a loud-speaker. A hybrid coupling network and a telephone line impedance balancing network are also conventionally included to permit coupling of the transmit and receive channel amplifiers to the associated telephone line. In such an arrangement a feedback loop exists which comprises the microphone, the transmit channel amplifier, a path through the hybrid coupling network from the output of the transmit channel amplifier to the input of the receive channel amplifier, the receive channel amplifier, the loud-speaker and acoustical paths from the loud-speaker to the microphone. The transmission of energy through the hybrid network from the transmit to the receive channel amplifier can be controlled and minimized by assuring that the associated balance network presents an impedance to the hybrid network which closely resembles that of the telephone line to which the hybrid network is connected. The amount of energy reaching the microphone from the loud-speaker via acoustical paths between them can be controlled and minimized by physically separating the microphone and the loud-speaker. Practicable limitations prevent complete elimination of the transmission of energy from the output of the transmit channel amplifier to the receive channel amplifier input and operational limitations prevent complete elimination of the transmission of energy from the loud-speaker to the microphone.

It is accordingly necessary to take further measures to overcome the undesirable consequences of the existence of the described feedback loop. The transmit and receive channel gains required to provide satisfactory loudness of received voice energy in both the transmit and receive directions generally have a sum of a magnitude that would normally result in oscillation due to the feedback loop. It is therefore common in prior art to arrange the switching of channel gains so that when one channel has normally required gain then the other channel has its gain reduced below its normal level. The amount of gain switched out, or loss switched in, is chosen to ensure that the instantaneous sum of the transmit and receive channel gains is such as to preclude oscillation due to the described feedback path. It is common practice in the art to employ gain control circuits which respond to signals derived from voice energy in the channels in such a way as to cause the channel in which voice energy is detected to assume normal gain and to cause a corresponding reduction in gain of the other channel.

There are many variables to consider in such voice switched systems including the amount of gain switched, the rate of change of gain both when switching a channel to normal gain and when reducing its gain, the provision or lack thereof of delays in causing gain switching upon detection of voice energy and the duration of any such delays which are introduced. In general, the greater the amount of gain switched the greater the coupling may be through the hybrid circuit and the greater the acoustical coupling may be between loud-speaker and microphone. However, the greater the amount of gain switched the more obvious it is to the user, and in particular to the distant party, that voice controlled gain switching is occurring. Noticeable gain switching is subjectively undesirable. Switching of gain between channels can result in clipping of speech when a person begins or finishes talking. Gain switching can also occur erroneously due to background noises at the loud-speaking telephone, unwanted noises on the telephone line, acoustical coupling between the loud-speaker and the microphone and also due to the coupling between the transmit channel and receive channel through the hybrid network.

Many circuit and equipment configurations have been proposed in the past to prevent or minimize one or more of these described effects and many have taken into account one or more of the design variables heretofor mentioned. There is still, however, a great need for improvement over prior art voice controlled gain switched loud-speaking telephone systems and the loud-speaking telephone system of the present invention overcomes the problems associated with prior art systems.

SUMMARY OF THE INVENTION

This invention relates to loud-speaking telephone systems and more particularly to loud-speaking telephone systems employing voice controlled gain switching.

It is accordingly an object of the present invention to provide a loud-speaking telephone system employing voice controlled gain switching in which the occurrence of gain switching is subjectively difficult to detect by both the user and the distant party with whom he is speaking.

It is also an object of the present invention to provide a loud-speaking telephone system employing voice controlled gain switching in which erroneous gain switching, due to background noise, telephone line noise and coupling between the output of one channel and the input of the other channel ia alleviated.

It is also an object of the present invention to provide a loud-speaking telephone system employing voice controlled gain switching which has means to achieve good hybrid balance.

It is also an object of the present invention to provide a loud-speaking telephone system employing voice controlled gain switching which obviates the need to employ a conventional hybrid transformer which requires a high degree of balance of its windings and which also must operate satisfactorily with telephone loop d.c. current flowing in its windings.

It is a further object of the present invention to provide a loud-speaking telephone system employing voice controlled gain switching which has provisions for both continuous and step control of the loud-speaker volume.

It is a further object of the present invention to provide a loud-speaking telephone system which may be integrated into a system employing an automatic or repertory dialing system and a conventional telephone handset.

The present invention provides an improvement for a voice controlled gain switched loud-speaking telephone system which has a receiving channel with a receiving detector and a receiving amplifier gain switch and a transmitting channel with a transmitting detector and a transmitting amplifier gain switch. The improvement includes a receiving detector gain switch operatively connected to the transmitting detector and to the receiving detector and a transmitting detector gain switch operatively connected to the receiving detector and to the transmitting detector. The improved voice controlled gain switched loud-speaking telephone system may be operatively connected to automatic dialing circuits. The improved system also has an improved hybrid circuit, provisions for improved loud-speaker volume control and other improved features.

BRIEF DESCRIPTION OF THE DRAWINGS

The invention will be hereinafter more fully described with reference to the accompanying drawings in which.

DETAILED DESCRIPTION OF THE PREFERRED EMBODIMENT

A practical advantage of loud-speaking telephone systems is that a telephone conversation can be conducted without the necessity of holding a telephone handset. Thus the user may have both hands conveniently free. This aspect of loud-speaking telephone systems has led to the common usage of the expression "hands free" in reference to such systems and also to the circuits and components thereof and hands free will be utilized hereinafter with reference to circuits and components of the loud-speaking telephone system of this invention.

Figure 1:
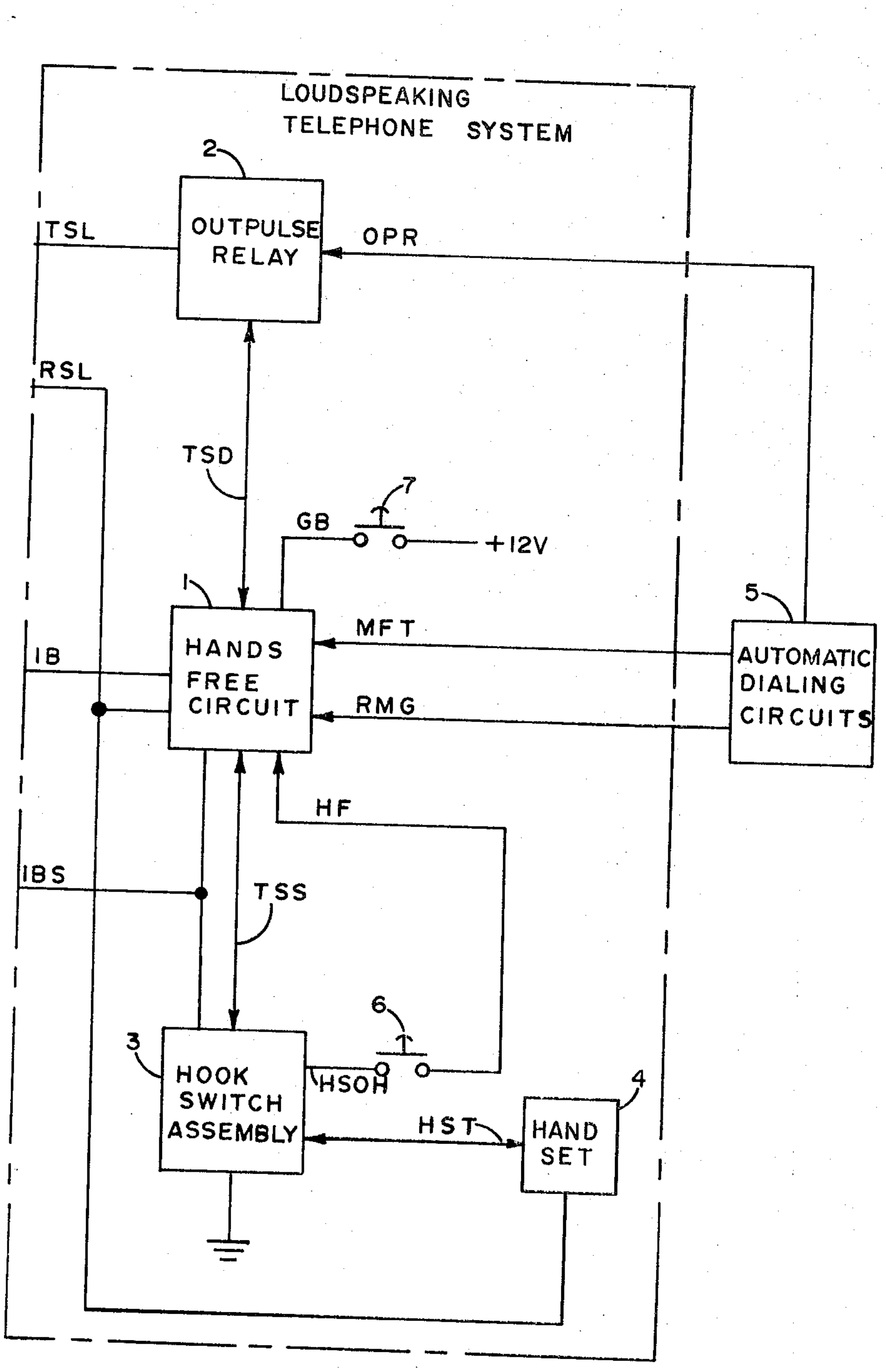
FIG. 1 is a block diagram of the loud-speaking telephone system of this invention connected to automatic dialing circuits.

FIG. 1 shows how hands free circuit 1 of the loud-speaking telephone system of the invention may be used in conjunction with an outpulse relay 2, a hook switch assembly 3, a handset 4, and an automatic dialing circuit 5 to form an integrated larger telephone system with convenient means for achieving muting of both handset 4 and hands free circuit 1 during a dialing sequence and of impressing on the telephone line both loop interrupt dialing and multi-frequency tone dialing pulses. Loop interrupt dialing, of course, refers to the dialing method in which normally closed contacts in series with one conductor of the telephone line are opened and closed in a pulsed sequence representing the digits being dialed. A conventional rotary telephone dial performs the dialing function in this manner. The expression d.c. pulse dialing is sometimes used to describe this dialing method. The tip and ring side of the telephone line are connected via leads TSL and RSL respectively. Lead RSL is permanently connected to one side of both the hands free circuit 1 and the handset 4. Lead TSL is connected via a normally closed contact of outpulse relay 2 to lead TSD, and when the hands free circuit 1 is not used, a normally closed relay contact within the hands free circuit connects lead TSD to lead TSS. The hook switch assembly 3 is operated by the handset 4, so that when handset 4 is placed in its rest or "on hook" position no connection is made to lead HST, and no telephone line loop current is drawn. If the handset 4 is lifted, however, the hook switch assembly 3 connects the lead TSS to the lead HST, and the handset 4 is then placed across the telephone line via the previously described path from the lead TSL to the lead TSS.

If the hadnset 4 is left on hook, the lead HSOH is connected to ground by a contact set on the hook switch assembly 3. Switch 6, which has toggle action can then be used to extend this ground to lead HF, which causes connection of the hands free circuit 1 to the leads RSL and TSD and also causes flow of d.c. current through the telephone line which is connected to the leads TSL and RSL to cause seizure of the line. Since the ground on lead HSOH is removed when the handset 4 is lifted, the hands free circuit 1 is automatically disconnected when the handset 4 is lifted even if switch 6 connects the lead HSOH to the lead HF. However, the hands free circuit 1 can be reconnected by simply replacing the handset 4 on hook.

Pushing the momentary action switch 7 causes +12 volts d.c. to be temporarily connected to the lead GB. This operates a relay within the hands free circuit which latches to +12 volts d.c. and which causes a step increase in the receive channel gain and thus increased loud-speaker output level from the hands free circuit 1. The higher gain remains until the ground on the lead HF is removed.

When the automatic dialing circuits 5 are used, loop interrupt dialing is performed by interrupting telephone line loop current through the outpulse relay 2 in standard rotary dial format. This is achieved by pulses on the lead OPR, causing the relay 2 to pull in a pattern representing the dialed telephone number. To prevent clicking in handset 4 when it is used, the receiver muting signal or contact set normally provided by automatic dialers is used to put a ground on the lead RMG during the dialing sequence. This results in activation of the hands free circuit 1 and lead TSD is then disconnected from lead TSS, thus disconnecting the handset 4. This will occur whether handset 4 is lifted or not. Telephone line loop current is drawn through leads TSL and RSL by the hands free circuit 1, and to prevent loud clicking in its loud-speaker as a result of the interruptions via relay 2, a ground on lead RMG provided by the receiver muting signal or contact set also activates muting circuits within the hands free circuit 1. The switch to the hands free circuit 1 during dialing even if handset 4 is lifted achieves two purposes; no separate muting contacts are needed for the handset 4, and if multi-frequency tone signaling is performed, the transmit channel of the hands free circuit 1 can be used to impress these tones on the telephone line. Such tones can be provided by the automatic dialing circuits 5 over the lead MFT.

Figure 2:
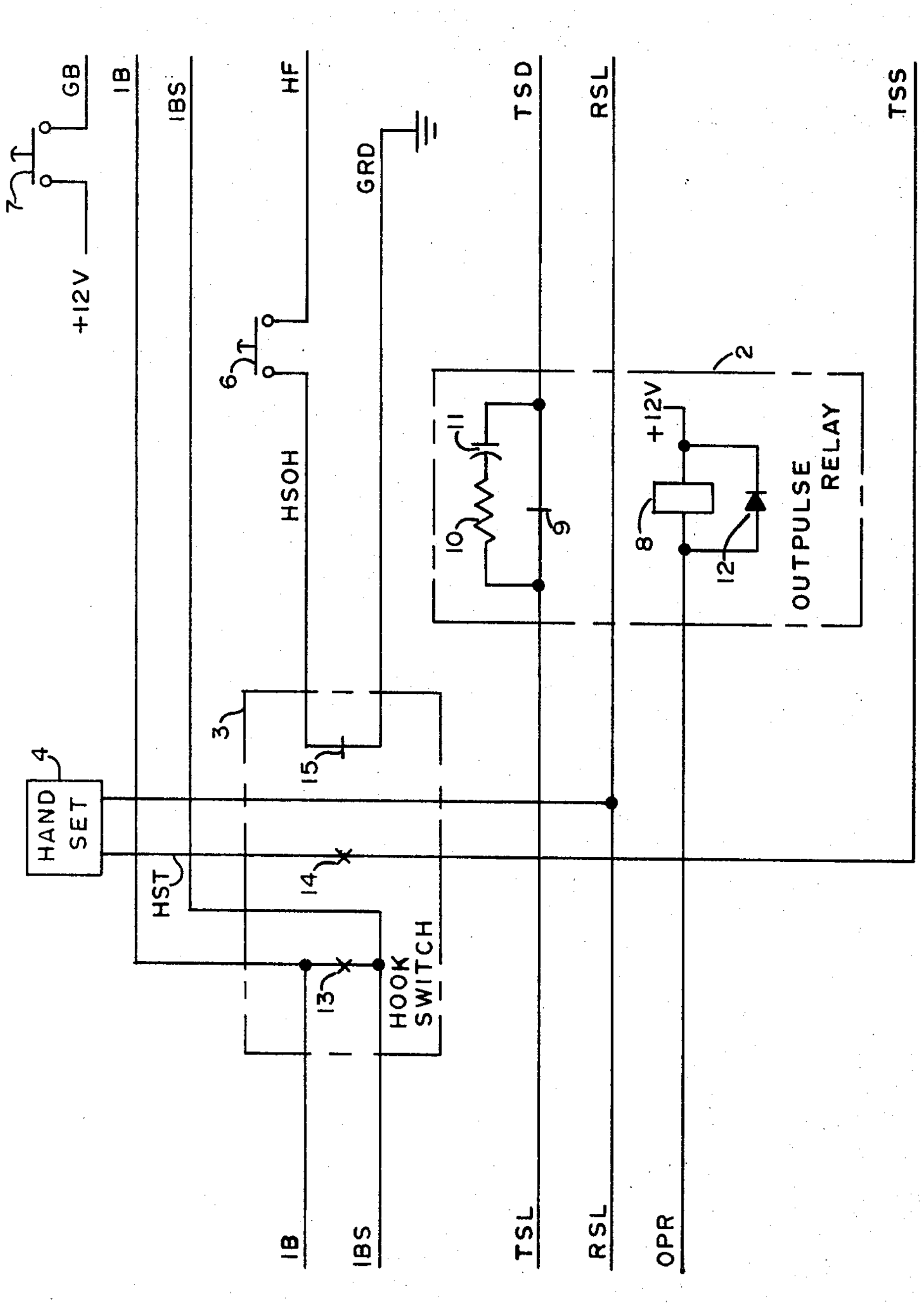
FIG. 2 is a detailed circuit diagram of a portion of the system illustrated in FIG. 1.

FIG. 2 shows the schematic diagram for the connections of the telephone leads TSL and RSL, the outpulse relay 2, the hook switch assembly 3, and the handset 4, and also shows the switches 6 and 7 illustrated in FIG. 1. Outpulse relay 2 is shown to have one side of its coil 8 connected to +12 volts d.c. and the other side connected to the lead OPR, which when connected to ground causes the relay 2 to operate, breaking the connection between the lead TSL and the lead TSD via its contact set 9. The resistor 10 and the capacitor 11 reduce electric arcing at the contacts and thus increase contact life. The diode 12 shunts the reverse induced voltage across the coil 8 when the ground on the lead OPR is removed. The hook switch assembly 3, via the contact set 13, connects the lead 1B to the lead 1BS when the handset 4 is lifted. It also connects the lead TSS to lead HST via the contact set 14 and removes the ground from the lead HSOH via the contact set 15.

Figure 3A:
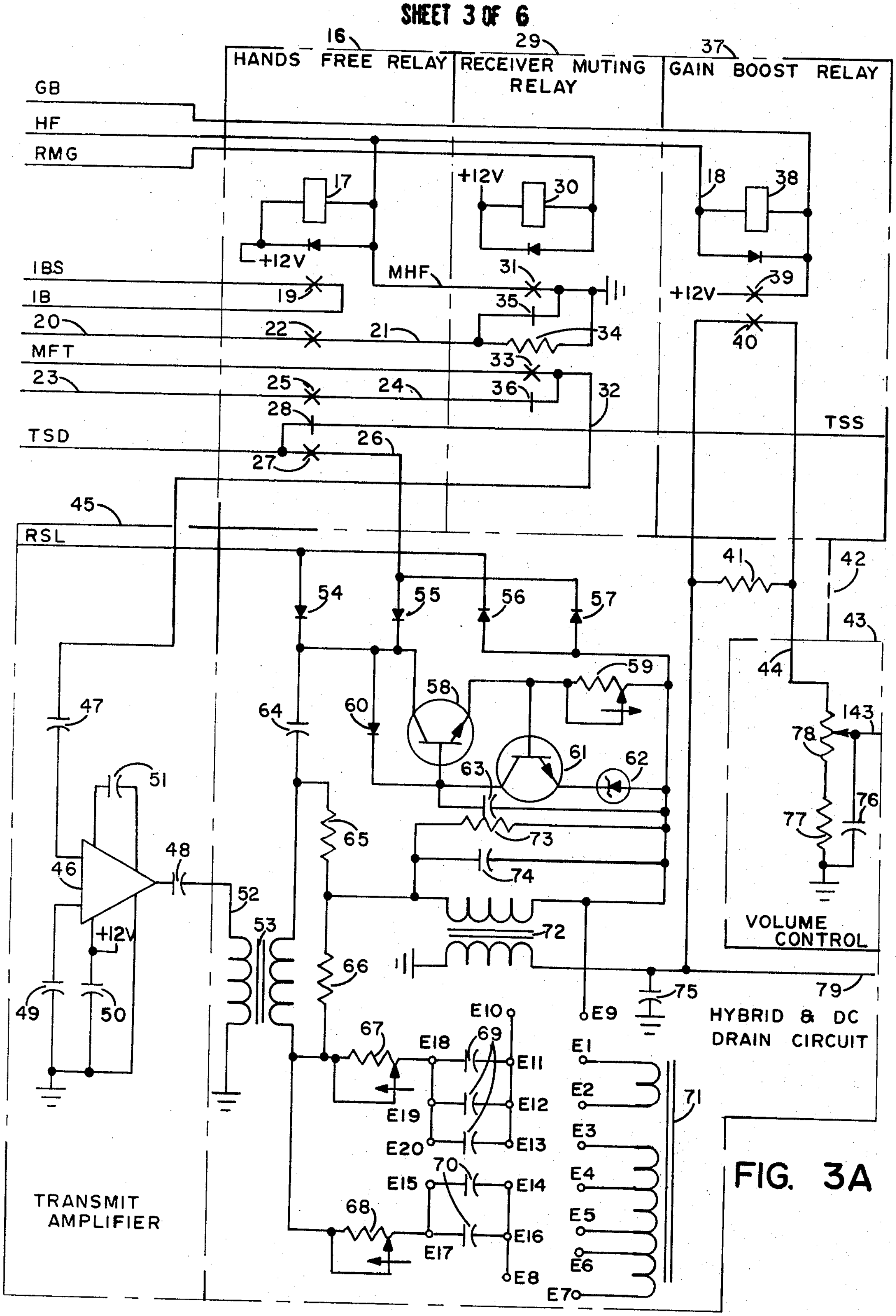
FIGS. 3A, 3B, 3C and 3D are detailed circuit diagrams of a portion of the loud-speaking telephone system illustrated in FIG. 1.

The detailed circuitry of the hands free circuit 1 is shown in FIGS. 3A, 3B, 3C, and 3D. In FIG. 3A the hands free relay 16 is shown to have a coil 17 connected on one side to +12 volts d.c., and on the other side to the leads HF, MHF, and 18. If a ground is placed on the lead HF, the relay 16 pulls connecting the lead 1B to the lead 1BS via the contact set 19, connecting the lead 20 to the lead 21 via the contact set 22, connecting the lead 23 to the lead 24 via the contact set 25, and connecting the lead TSD to the lead 26 via the contact set 27, while breaking the connection from the lead TSD to the lead TSS via the contact set 28. The receiver muting relay 29 is shown to have one side of its coil 30 connected to a +12 volts d.c., and the other side to the lead RMG. If a ground is placed on the lead RMG, the relay 29 pulls, connecting the lead MHF to ground via the contact set 31. This causes the hands free relay 16 to pull if it has not already been pulled by a ground on lead HF. The receiver muting relay 29, when pulled, also connects the lead MFT to the lead 32 via the contact set 33 while breaking the short across the resistor 34 via the contact set 35 and breaking the connection from the lead 24 to the lead 32 via the contact set 36.

The gain boost relay 37 is shown to have one side of its coil 38 connected to lead GB and to its contact set 39, and the other side connected to the lead 18. If lead 18 is at ground potential due to a ground from the lead HF or the lead MHF, a momentary application of +12 volts d.c. to lead GB causes gain boost relay 37 to pull and latch through its contact set 39. If the lead 18 at any time loses its path to ground, the relay 37 falls. Contact set 40 of the gain boost relay 37 shorts out resistor 41 in the hybrid and d.c. drain circuit 42 to increase the signal level to the volume control 43 over lead 44. As a result of the gain boost relay 37, means are provided to achieve convenient push button increase of loud-speaker volume when a poor telephone line connection is encountered or when for some other reason the received signal is unusually weak. By having the increase automatically removed when use of the hands free circuit 1 is interrupted, the next call can be initiated without having to readjust the volume control for the normal listening level.

Transmit amplifier 45 contains an integrated circuit audio amplifier 46, typically Motorola type 1,454, with its associated coupling, decoupling, and compensation capacitors 47 through 51. It provides ten times voltage gain for the signal on lead 32 and has an output on lead 52. This signal is coupled via a transformer 53 into the hybrid and d.c. drain circuit 42.

The hybrid and d.c. drain circuit 42 connects the leads RSL and 26 to a diode bridge arrangement, comprising diodes 54 through 57, which applies the telephone line d.c. voltage on leads RSL and TSD with assured correct polarity across transistor 58 and its adjustable emitter resistor 59. Transistor 58 receives its base bias current through constant current diode 60, but some of this current is shunted out by the transistor 61, which conducts when the voltage across the resistor 59 exceeds the sum of the zener voltage of the diode 62 and the base to emitter diode voltage of the transistor 61. Since the voltage across the resistor 59 is a function of the current through the transistor 58, and an increase in this voltage causes a heavier current through the transistor 61 and therefore less base current to transistor 58, this arrangement stabilizes the current through the transistor 58 to a value independent of the voltage across it but inversely proportional to the value of the resistor 59. The d.c. current drain can therefore be adjusted by adjusting the resistor 59 while the a.c. impedance of the circuit remains very high. Capacitor 63 filters out noise generated by the zener diode 62.

The a.c. signal on the telephone line leads RSL and TSD are coupled via capacitor 64 to the junction of one winding of transformer 52 and resistor 65. A hybrid bridge is formed by the two equal resistors 65 and 66, the telephone line impedance as seen through capacitor 64, and the impedance of a balance network made up of adjustable resistors 67 and 68, capacitors 69 and 70 and coil 71. These components 67 through 71 can be value selected and connected via strap points E1 through E20 to form an impedance closely matching that of the telephone line. Since the impedances of transformer 53 and capacitor 64 are low, and those of the d.c. drain circuit, transformer 72, and resistor 73 are high, not only does a close match between the telephone line impedance and the balance network impedance means a good sidetone suppression across the hybrid bridge, it also means that the telephone line sees a nearly perfect matching termination, for minimum echoes and optimum transmission performance. The adjustable d.c. drain current aids in optimizing the loop performance. The separation of d.c. current drain from the coupling transformers furthermore allows low distortion and good frequency response even with very small transformers.

Capacitor 74 adjusts the upper end of the frequency response to that of the telephone voice band. Capacitor 75 decouples RF signals picked up by the telephone line and coupled capacitively across the transformer 72. Capacitor 76 on the output of volume control 43 aids in this function. Resistor 77 on the lower end of volume control potentiometer 78 prevents the speaker volume from being completely turned down. The sliding contact of volume control potentiometer 78 is connected to lead 143. Lead 79 provides an output directly from the hybrid and d.c. drain circuit 42.

Figure 3B:
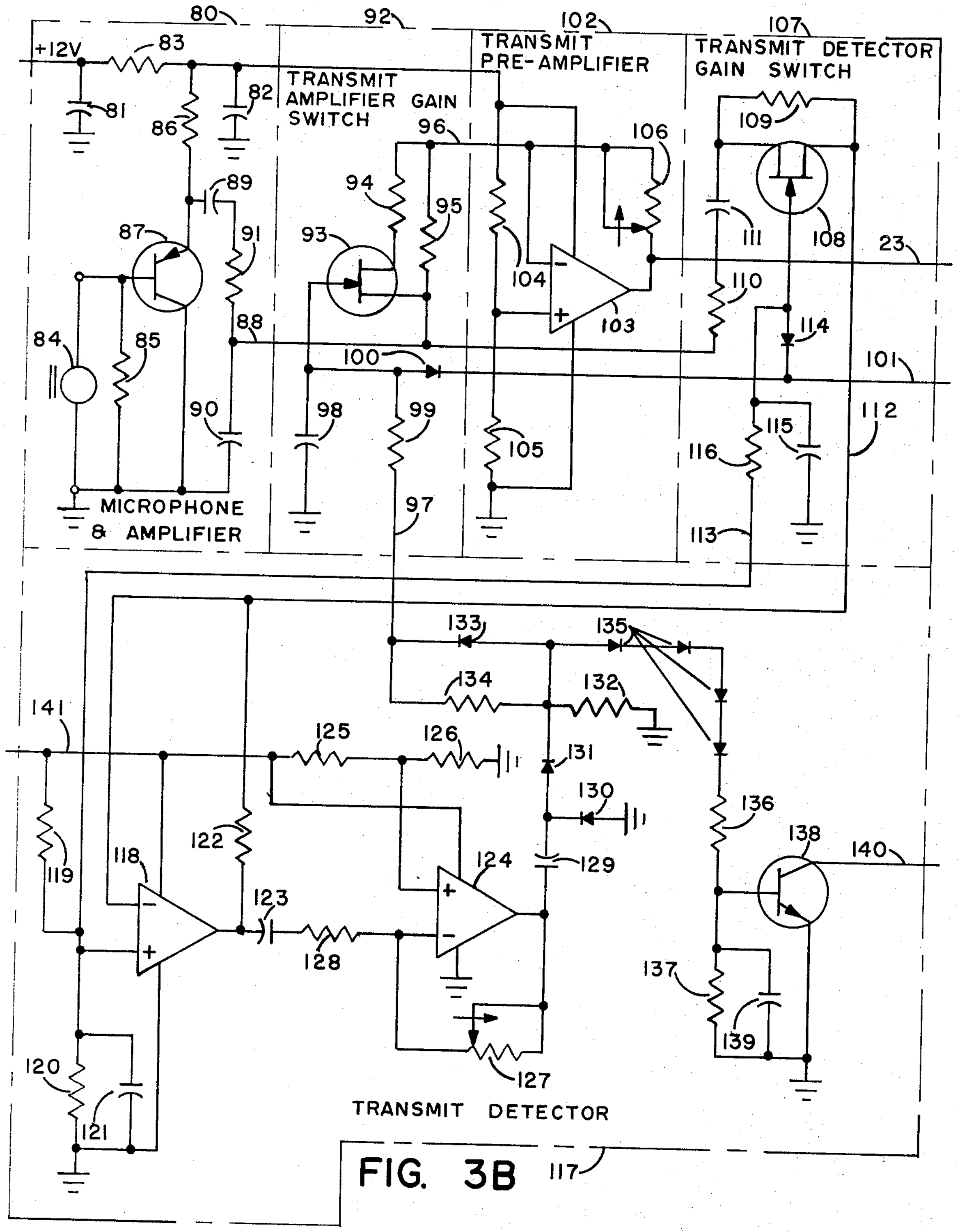

In FIG. 3B, microphone and amplifier 80 is shown to comprise a d.c. supply filtering network containing capacitors 81 and 82 and resistor 83. It also has a microphone element 84 and an emitter follower stage made up of resistors 85 and 86 and transistor 87. The output on lead 88 is provided via a coupling and frequency response shaping network comprising capacitors 89 and 90 and resistor 91. A transmit amplifier gain switch 92 contains a voltage variable resistive network comprising field effect transistor 93 and resistors 94 and 95 whose values are chosen to ensure that the resistance to a.c. signals between leads 88 and 96 is four times greater when field effect transistor 93 is biased to cut off than it is when field effect transistor 93 is biased for full conduction. Bias voltage for field effect transistor 93 is provided by having source and drain both d.c. connected to the approximately +7 volts d.c. level on lead 96, and feeding the gate via lead 97 and resistor 99. This lead 97, in absence of any voice signals in the microphone and amplifier circuit 90 has ground potential, resulting in cut off bias of field effect transistor 93. When a sufficiently high positive voltage signal appears on lead 97 as a result of a voice signal in microphone and amplifier 80, field effect transistor 93 reaches its full conduction state after a short delay introduced by capacitor 98 and resistor 99. This delay is of a length about twice the average rise time of a voice signal envelope. The reason for the delay is twofold, to achieve a smooth and virtually inaudible gain switching, and to give time to inhibit detection of sidetone before sidetone signals have reached a level where they could cause competing gain control signals.

Diode 100 allows a rapid discharge of capacitor 98 when the voltage on lead 101 drops. The transmit preamplifier 102 is a standard operational amplifier 103 biased by resistors 104 and 105. Its gain is a function of the ratio of resistance of variable resistor 106 and that of transmit amplifier gain switch 92 and its output is on lead 23. Transmit detector gain switch 107 contains a voltage variable resistive network comprising field effect transistor 108 and resistors 109 and 110. Capacitor 111 provides d.c. blocking and also limits the lower end of the frequency response. The values of the resistors 109 and 110 are chosen to ensure that the resistance to a.c. signals between the leads 88 and 112 is about thirty times as high when field effect transistor 108 is biased to cut off as it is when the field effect transistor 108 is biased for full conduction. Bias voltage for field effect transistor 108 is provided by having source and drain both d.c. connected to the approximately +6 volts d.c. level on lead 112, and feeding the gate via lead 113 and resistor 116. Lead 113 also has about +6 volts d.c. on it, resulting in full conduction of field transistor 108. When the voltage on lead 101 drops, diode 114 rapidly discharges capacitor 115 to bring field effect transistor 108 to its cut off condition. When lead 101 goes back to the +6 volts d.c. level, resistor 116 causes capacitor 115 to charge with a time constant in the 0.1 second range.

The transmit detector 117 has two stages of amplification. The first stage uses operational amplifier 118 which is biased by resistors 119 and 120. Capacitor 121 filters this bias voltage. The gain of this stage is determined by the ratio of resistor 122 and the impedance of transmit detector gain switch 107. The output of amplifier 118 is coupled to the next stage by capacitor 123. The second stage uses operational amplifier 124 which is biased by resistors 125 and 126. The gain of this stage is determined by the ratio of variable resistor 127 and input resistor 128. The output is coupled by capacitor 129 to a positive rectification circuit comprising diodes 130 and 131 and resistor 132.

The output of this rectification circuit, in the absence of any voice signals in the microphone and amplifier circuit 80, is held at ground potential by resistor 132. An output from the rectification circuit is directly coupled via diode 133 to lead 97, causing capacitor 98 in transmit amplifier gain switch 192 to charge via resistor 99. When the output of the rectification circuit on 97 disappears, resistor 134 provides a slow discharge path for capacitor 98 unless the voltage on lead 101 drops. The discharge time constant of capacitor 98 via resistors 99, 132, and 134 is about 0.5 seconds. The reason for this long time constant is to prevent a change in the conduction of field effect transistor 93 between syllables and words in the speech energy to microphone and amplifier 80. The diode chain 135 and voltage divider resistors 136 and 137 set the requirements for a certain minimum level on the rectified output across resistor 132 before transistor 138 conducts. Capacitor 139 introduces a slight delay to reduce the sensitivity to brief, isolated noise bursts. When transistor 138 conducts, the voltage on lead 140 goes from a normal level of about +6 volts d.c. to near zero volts d.c. Power for the two stages of amplification in transmit detector 117 is provided by lead 141, carrying approximately +11 volts d.c.

Figure 3C:
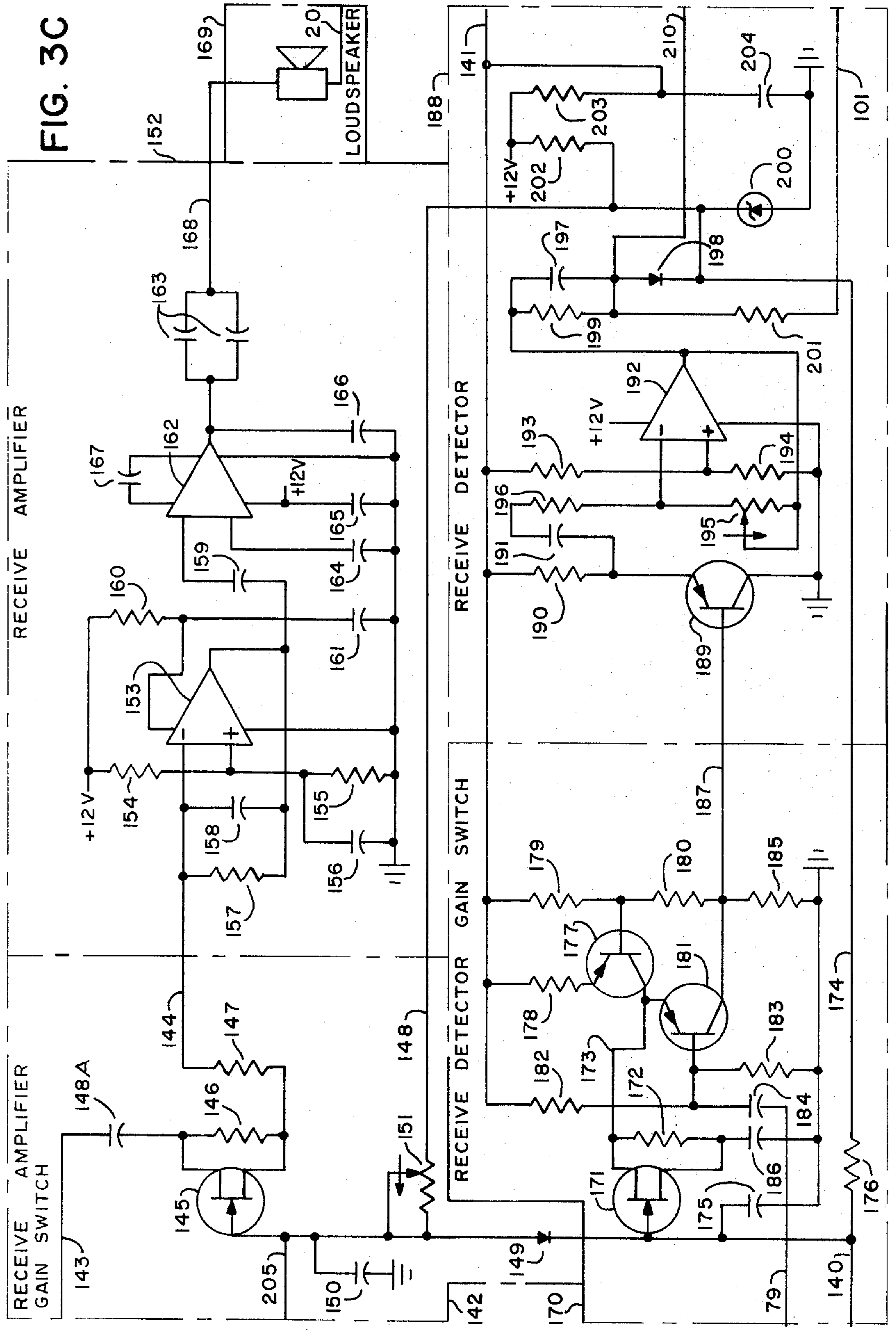

In FIG. 3C, receive amplifier gain switch 142 is shown to have an input on lead 143 from volume control 43 (FIG. 3A). Between leads 143 and 144 is inserted a voltage variable resistive network comprising field effect transistor 145 and resistors 146 and 147. Capacitor 148A provides d.c. blocking. Resistors 146 and 147 are chosen to provide about four times as high a resistance for a.c. signals between leads 143 and 144 when field effect transistor 145 is biased to cut off as when it is biased for full conduction. Bias voltage for field effect transistor 145 is provided by having source and drain both d.c. connected to the approximately +6 volts d.c. level on lead 144 and feeding the gate via lead 148 and variable resistor 151. Lead 148 also has about +6 volts on it, resulting in full conduction of field effect transistor 145. When the voltage on lead 140 drops, diode 149 rapidly discharges capacitor 150 to bring field effect transistor 145 to its cut off condition. When the voltage on lead 140 goes back to the +6 volts d.c. level, variable resistor 151 causes capacitor 150 to charge with a time constant of about 0.5 second. Resistor 151 is adjustable so that this time constant can be set equal to or slightly longer than the time constant of about 0.5 second in the receive amplifier gain swtich 142 described earlier.

The receive amplifier 152 has two stages of amplification. The first stage uses operational amplifier 153 which is biased by resistors 154 and 155. Capacitor 156 filters this bias voltage. The gain of this stage is determined partly by the ratio of resistor 157 to the impedance of receive amplifier gain swtich 142, and partly by the capacitor 158, which tailors the upper frequency response of the stage to that of the telephone voice band. The output of operational amplifier 153 is coupled to the next stage by capacitor 159. The d.c. power to operational amplifier 153 is filtered by resistor 160 and capacitor 161. The second stage uses integrated circuit audio amplifier 162, typically Motorola type 1,454, and its associated coupling, decoupling and compensation capacitors 163 through 167 and provides ten times voltage gain of the signal from the preceeding stage and has an output on lead 168. This signal lead 168 is connected to one side of loud-speaker 169, the other side of which is connected via lead 20 to hands free relay 16 (FIG. 3A).

The receive detector gain switch 170 contains a voltage variable resistive network comprising field effect transistor 171 and resistor 172. This network has at least thirty times as high a resistance for a.c. signals between the lead 173 and the capacitor 186 when field effect transistor 171 is biased to cut off as when it is biased for full conduction. Bias voltage for field effect transistor 171 is provided by having source and drain both d.c. connected to the approximately +6 volts d.c. level on lead 173, and feeding the gate via lead 174 and the resistor 176. Lead 174 also has about +6 volts d.c. on it, resulting in full conduction of field effect transistor 171. When the voltage on lead 140 drops, capacitor 175 is rapidly discharged to bring field effect transistor 171 to its cut off condition. Capacitor 175 is charged to about +6 volts d.c. through resistor 176 with a time constant of about 0.02 seconds when the voltage on lead 140 is no longer pulled low by transistor 138 (FIG. 3B). Transistor 177 and its associated resistors 178, 179 and 180 serve as a constant current source for the emitter of transistor 181. The latter is biased via resistors 182 and 183 and receives an input signal via capacitor 184 from lead 79. Resistor 185 serves as a collector resistor for transistor 181 in this stage, which can be considered to be connected as a common emitter type stage. With field effect transistor 171 in the full conduction state, capacitor 186 can be considered an effective bypass to ground for the emitter of transistor 181, and a net gain is achieved in signal level between leads 79 and 187. With field effect transistor 171 in the cut off state, the high a.c. impedance of the collector of transistor 177 and resistor 172 causes a net loss in signal level, so that the level on lead 187 is at least thiry dB below that in the former case.

Receive detector 188 has an emitter follower input, made up of transistor 189 and resistor 190. The output is coupled via capacitor 191 to a gain stage containing operational amplifier 192, which is biased by resistors 193 and 194. The gain of the receive detector 188 is determined by variable resistor 195 and input resistor 196. The output is coupled via capacitor 197 to diode 198, which acts as a negative rectifier. This negative rectifier has an output voltage on lead 101 of about +6 volts d.c. when there is no voice signal present in the receive detector 188. This voltage is provided by resistor 199 from the output of operational amplifier 192. When a voice signal appears on the output of operational amplifier 192, diode 198 and zener diode 200 prevent the voltage on lead 101 from going higher than about +6 volts d.c., and capacitor 197 is therefore charged during the positive swing of the signal. During the negative swing, the combined voltage of the signal and the charge on capacitor 197 actually brings the voltage on lead 101 to a slightly negative value. The small resistor 201 introduces a brief time constant for the discharge of the capacitors connected to lead 101 via diodes 100 and 114 (FIG. 3B) to achieve smoother gain switching. Resistor 202 is a bias resistor for zener diode 200, and resistor 203 and capacitor 204 filter the supply voltage on lead 141.

Figure 3D:
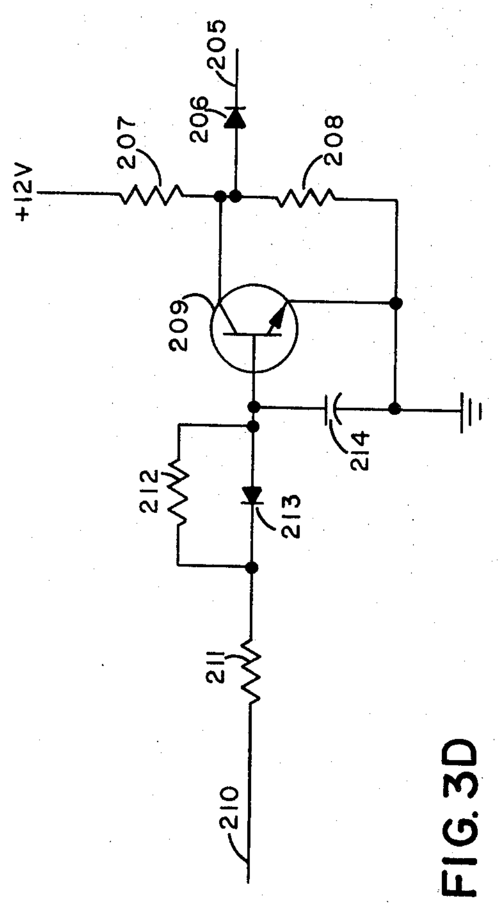

FIG. 3D shows how an additional time constant circuit may be added to receive detector 188 via lead 205 and 210 in systems where increased switching speed is desired. As illustrated in FIGS. 3C and 3D, when a received signal appears immediately following the end of transmission, a more rapid return to full conduction of field effect transistor 145 is achieved by charging capacitor 150 through diode 206 and voltage divider resistors 207 and 208. This charge path is enabled when transistor 209 stops conducting. Normally, the approximately +6 volts d.c. level on lead 210 causes a base current to flow in transistor 209 via resistors 211 and 212. A high level output from operational amplifier 192 causes the voltage on lead 210 to go slightly negative during the negative swing of the signal, and diode 213 then charges capacitor 214 to a voltage below the conduction point for transistor 209, which is then cut off. Resistors 207 and 208 should be chosen to have equal values and reduce the charging time of capacitor 150 to about 0.05 seconds.

The manner in which the system functions will be described with respect to FIGS. 3A, 3B, 3C and 3D. With no voice signals in the circuit, the receive detector 188 and transmit detector 117 have outputs on leads 101 and 205 and 97 and 140 respectively which allows passage of signals through receive amplifier gain switch 142 with a certain amount of loss and through transmit amplifier gain switch 92 with a loss about 12 dB higher than the loss through receive amplifier gain switch 142. A received signal causes outputs from receive detector 188 on leads 101 and 205 to maintain or achieve the above condition. A signal appearing in transmit detector 117 through lead 97 causes the loss in transmit amplifier gain switch 92 to decrease by about 12 dB and through lead 140 causes the loss in receive amplifier gain switch 142 to increase by about 12 dB. The gain from microphone element 84 to lead 52 and the gain from lead 143 to loud-speaker 169 therefore have a virtually constant sum. However, the distribution of gain between these two paths, which will be referred to as the transmit and receive channels respectively, is changed as a result of signals appearing on their inputs.

This is a well known method of maintaining a low sum of gains in the two channels, while achieving optimum gain in the one having a signal. The problem associated with prior art circuits of this type is due to the leakage of transmitted signal across the two-to-four-wire conversion hybrid circuit required for a two wire telephone line and the signal in the microphone generated by sounds from the loud-speaker. Since the receive detector in prior art circuits reacts to the leaked transmission signal, and the transmit detector reacts to the loud-speaker sound from a received signal, a competition takes place between the transmit and receive detectors for control of the gain switches. This places limitations on the sensitivity of the transmit and receive detectors for the following reason. If the receive channel gain is high, even a weak incoming signal can cause a loud-speaker output comparable in volume to a weak voice from the user of the system. A received signal can then erroneously decrease the receive channel gain and increase the transmit channel gain if the transmit detector is sensitive enough to react to this level of microphone sound. It must therefore be set to a lower sensitivity. The receive detector sensitivity can not be increased to overcome a high sensitivity of the transmit detector because it would then react to very low levels of signal leak across the two-to-four-wire conversion hybrid circuit.

The improved function of the present system is in principle based on the incorporation of two additional gain switches which reduce the normally high sensitivity of any one of the transmit and receive detectors 117 and 188 respectively when the other one has on output. In this manner the transmit detector 117 can not compete with receive detector 188 even though the received signal may be weak and the loud-speaker sound in the microphone strong. Nor can a signal leak across hybrid and d.c. drain circuit 42 cause an output from the receive detector 188 when a sound from the user's voice hits the microphone element 84.

Important to the proper implementation of this system are the delays involved in the changing of signal loss in the four gain switches, and the amount of loss introduced in the basically three different steady states of the circuit. These three states are: no voice signals are present, hereafter referred to as the quiescent condition; voice signals are present in the receive channel, hereafter referred to as the receive condition; and voice signals are present in the transmit channel, hereafter referred to as the transmit condition.

In the quiescent condition, all gain switches except transmit amplifier gain switch 92 have low signal loses. In the receive condition an output from receive detector 188 on lead 101 causes an increased signal loss in the transmit detector gain switch 107 to prevent the transmit detector 117 from detecting microphone signals due to loud-speaker sounds. In the transmit condition, transmit detector gain switch 107 has a low signal loss. The transmit detector 117 then produces an output on lead 97 to decrease the loss in the transmit amplifier gain switch 92 in order to obtain optimum gain in the transmit channel and produces an output on lead 140 to increase the loss in the receive detector gain switch 170, preventing the receive detector 188 from detecting leaked transmitted signals on lead 143 and increasing the loss in receive amplifier gain switch 142 to prevent such leaked signals from generating sounds in the loud-speaker 169.

A rapid decrease in signal transmission through the transmit detector gain switch 107 and the transmit amplifier gain swtich 92 when switching from transmit to receive condition insures that the loud-speaker sound does not cause undesirable outputs from the transmit detector 117 before such detection has been disabled. A rapid decrease in signal transmission through the receive detector gain switch 170 and the receive amplifier gain switch 142 when switching from quiescent or receive condition to transmit condition insures that the leakage of transmitted signal across the hybrid and d.c. drain circuit 42 does not cause undesirable outputs from the receive detector 188 or loud-speaker reproduction of this sound before these functions have been disabled.

The somewhat slower increase in signal transmission through the transmit amplifier gain switch 92 when switching from quiescent or receive condition to transmit condition and through the receive amplifier gain switch 142 when switching from the transmit to the receive condition insures that proper function is achieved by the signals on leads 101 and 140.

The relatively long time constant associated with the return to a decreased level of signal transmission through transmit amplifier gain switch 92 when switching from the transmit to the quiescent condition prevents loss of transmission between words and syllables.

The relatively long time constant associated with the return to an increased level of signal transmission through receive amplifier gain switch 142 when switching from the transmit to the quiescent condition is matched to the one described immediately above to maintain the sum of the losses in the transmit amplifier gain switch 92 and the receive amplifier gain switch 142 constant during return to quiescent conditions.

The somewhat faster time constants associated with the return to an increased level of transmission through transmit detector gain switch 107 and receive detector gain switch 170 when switching from receive or transmit condition respectively to quiescent condition enables faster rates of change in the transmit and receive amplifier gain switches 92 and 142 respectively when sounds impinging on microphone element 84 or a received signal on leads TSD and RSL make this desirable.

Although the invention has been described with reference to a preferred embodiment, it will be understood that variations and modifications may be made within the spirit and scope of the invention as defined in the claims.

What is claimed is:

1. A voice controlled gain switched loud-speaking telephone system having a loud-speaker, a receiving channel with a receive detector and a receive amplifier gain switch and having a transmitting channel with a transmit detector and a transmit amplifier gain swtich wherein the improvement comprises: a receive detector gain switch operatively connected to said transmit detector and to said receive detector, and a transmit detector gain switch operatively connected to said receive detector and to said transmit detector, said transmit detector having means to increase the signal loss in said receive detector gain switch and means to increase the signal loss in said receive amplifier gain switch when the system is in the transmit condition, said receive detector having means for causing an increased signal loss in said transmit detector gain switch when the system is in the receive condition.

2. The telephone system of claim 1, further comprising means for decreasing the signal loss in said transmit amplifier gain switch when the system is in the transmit condition.

3. The telephone system of claim 1, further comprising means for producing a low signal loss in said transmit detector gain switch when the system is in the transmit condition.

4. The telephone system of claim 1, wherein said receive detector gain switch and said transmit detector gain switch each comprises voltage controlled gain switching elements and means for delaying the gain switching response of said gain switching elements to gain control voltages.

5. The telephone system of claim 4, wherein said means for delaying the gain switching response of said gain switching elements comprise means for imposing a shorter delay upon application of said gain control voltages than the delay occurring upon removal of said gain control voltages.

6. The telephone system of claim 4, wherein each of said voltage controlled gain switching elements includes a field effect transistor.

7. The telephone system of claim 1, further comprising means for connecting said voice controlled gain switched loud-speaking telephone system to automatic dialing circuits.

8. The telephone system of claim 7, wherein said connecting means comprises an outpulse relay adapted to be connected to said automatic dialing circuits, a receiver muting relay adapted to be connected to said automatic dialing circuits and a hands free relay connected to said receiver muting relay.

* * * * *